United States Patent
Chentanez et al.

(10) Patent No.: US 11,113,861 B2
(45) Date of Patent: Sep. 7, 2021

(54) IMITATING MOTION CAPTURE CLIPS USING A NEURAL NETWORK

(71) Applicant: Nvidia Corporation, Santa Clara, CA (US)

(72) Inventors: Nuttapong Chentanez, Santa Clara, CA (US); Matthias Mueller-Fischer, Santa Clara, CA (US); Miles Macklin, Santa Clara, CA (US); Viktor Makoviichuk, Santa Clara, CA (US); Stefan Jeschke, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/570,908

(22) Filed: Sep. 13, 2019

(65) Prior Publication Data

US 2021/0082170 A1 Mar. 18, 2021

(51) Int. Cl.
| | |
|---|---|
| *G06T 13/80* | (2011.01) |
| *G06N 3/04* | (2006.01) |
| *G06N 3/08* | (2006.01) |
| *G06T 7/246* | (2017.01) |
| *G06T 1/20* | (2006.01) |

(52) U.S. Cl.
CPC ............... *G06T 13/80* (2013.01); *G06N 3/04* (2013.01); *G06N 3/08* (2013.01); *G06T 1/20* (2013.01); *G06T 7/248* (2017.01); *G06T 2207/10016* (2013.01); *G06T 2207/20084* (2013.01)

(58) Field of Classification Search
CPC ......... G06T 13/00–80; G06T 7/20–251; G06T 7/215; G06N 3/04; G06N 3/08–10; G06K 9/00342; G06K 9/00711; A63F 13/212; A63F 2300/105; A63F 13/211
See application file for complete search history.

(56) References Cited

U.S. PATENT DOCUMENTS

| | | | |
|---|---|---|---|
| 2016/0191945 A1* | 6/2016 | Gurbuz | H04N 19/124 375/240.15 |
| 2017/0127008 A1* | 5/2017 | Kankaanpaa | H04N 5/23238 |
| 2019/0325780 A1* | 10/2019 | Kim | G06N 20/00 |
| 2020/0234117 A1* | 7/2020 | Hafner | G06N 3/08 |

* cited by examiner

*Primary Examiner* — Todd Buttram

(57) ABSTRACT

This disclosure presents a process to generate one or more video frames through guiding the movements of a target object in an environment controlled by physics-based constraints. The target object is guided by the movements of a reference object from a motion capture (MOCAP) video clip. As disturbances, environmental factors, or other physics-based constraints interfere with the target object mimicking the reference object. A tracking agent, along with a corresponding neural network, can be used to compensate and modify the movements of the target object. Should the target object diverge significantly from the reference object, such as falling down, a recovery agent, along with a corresponding neural network, can be used to move the target object back into an approximate alignment with the reference object before resuming the tracking process.

15 Claims, 8 Drawing Sheets

IMITATING MOTION CAPTURE CLIPS USING A NEURAL NETWORK

TECHNICAL FIELD

This application is directed, in general, to a physics based imitation simulator and, more specifically, to using a deep reinforcement learning neural network with the imitation simulator.

BACKGROUND

Various types of simulators can be used to imitate the movement of objects. When simulating articulated movements, natural motions of the simulated object for a variety of motions are typically desired. Simulators, however, may have a limited number of motions and motion styles to use as models. For example, a simulator may be able to simulate two people performing a tango and a waltz, but may not be able to simulate different types of tangos at different tempos. Simply relying on simulation processes such as foot placement, base of support, and hard coded balancing rules, can result in poor simulations for a large variety of motions; especially when balancing the requirements of natural physical motion within the environmental constraints of a simulated environment. Additional factors, such as uneven terrain, collisions, and other character and environment interferences can further complicate the simulations of natural physics motion simulators.

SUMMARY

In one aspect, a method of imitating a reference object from a motion capture (MOCAP) video clip using a physics simulator and a neural network (NN) is disclosed. In one embodiment, the method includes: (1) tracking the reference object using a movement agent of a target object, and (2) adjusting a movement of the target object using the movement agent, wherein the movement agent utilizes an output from the NN to provide modifications to the movement, further wherein the modifications to the movement include employing at least one of an imitation threshold or a stability threshold, and wherein the output is indicative of at least one of: one or more joint torques, one or more joint positionings, one or more applied forces, and one or more proportional derivative (PD) controller gain parameters.

In a second aspect, a video generator system is disclosed. In one embodiment, the video generator system includes: (1) a physics simulator, to adjust movement of the target object using the movement agent and to generate a frame of the target object, and (2) a neural network (NN), to provide movement adjustments to a movement agent of a target object by indicating one or more of the movement adjustments utilizing one or more target angles of joints of a reference object from a MOCAP video clip, and by comparing an imitation threshold parameter and a stability threshold parameter with an orientation of the target object projected against an orientation of the reference object.

In another aspect, a computer program product having a series of operating instructions stored on a non-transitory computer-readable medium that directs a data processing apparatus when executed thereby to perform operations to imitate a reference object from a MOCAP video clip using a physics simulator and a NN is disclosed. In one embodiment the computer program product includes: (1) tracking the reference object using a movement agent of a target object, and (2) adjusting a movement of the target object using the movement agent, wherein the movement agent utilizes an output from the NN to provide modifications to the movement, further wherein the modifications to the movement include employing at least one of an imitation threshold or a stability threshold.

BRIEF DESCRIPTION

Reference is now made to the following descriptions taken in conjunction with the accompanying drawings, in which.

DETAILED DESCRIPTION

Figure 1:
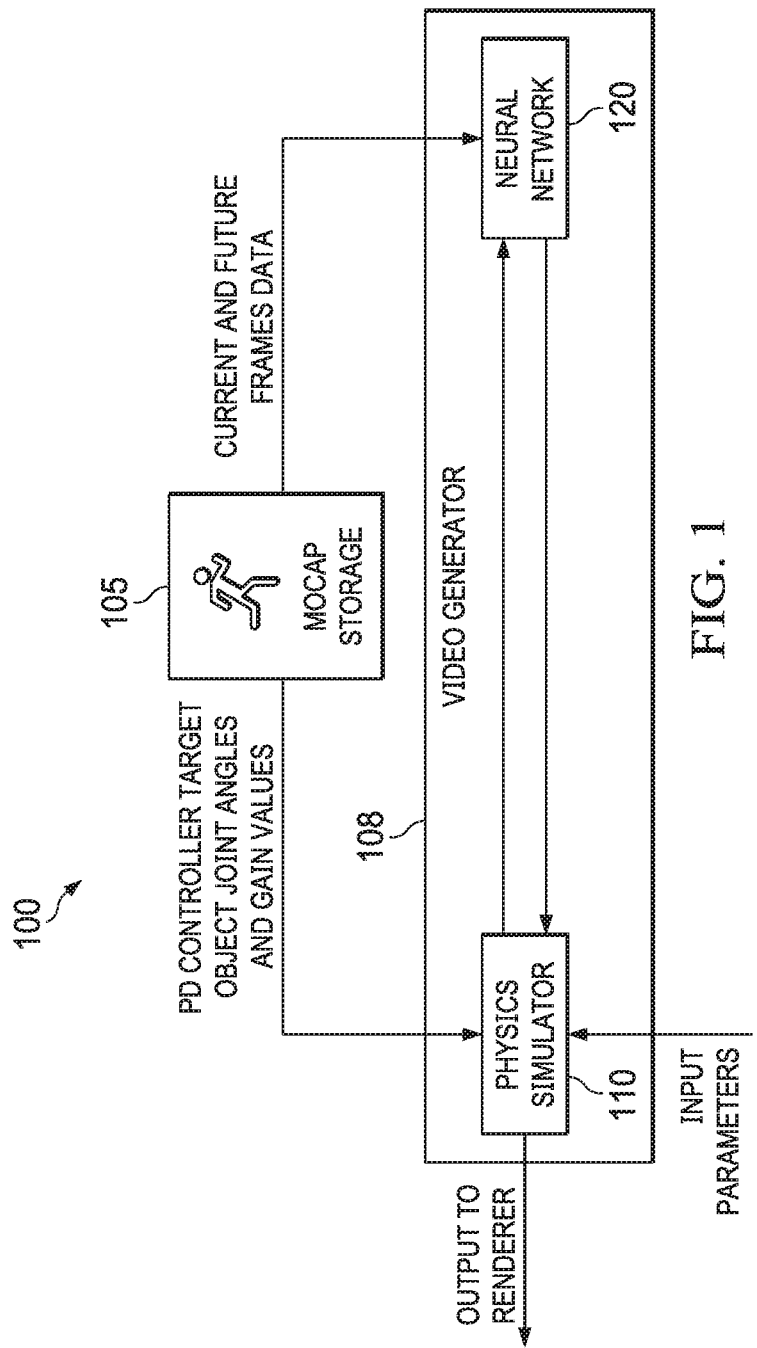
FIG. 1 is an illustration of a block diagram of an example physics-based motion capture imitation simulator.

Some computer simulations include an object or a character that performs a physical action, such as a character executing a martial arts movement in a game application. The physical action of the objects and characters can be generated as a video portion or video clip that can be inserted into a video scene that is displayed or stored for later use. Different methods can be used to generate the physical actions of the video clip. The movement can be hard-coded to direct the object or character to move in a certain way. Instead of, or in addition to, hard-coding the movement, a simulator can simulate the action using physical rules (physics-based simulation).

A physics-based simulator can use several methods for generating the physical motions, i.e., movement, of the character or object. A physics-based simulator can use hard coded movement, such as where lifting a leg will also lift a foot attached to the leg. A physics-based simulator can also use more detailed physics-based rules for the movement rules. Examples of physical rules include flexing a leg muscle by a specified percentage will result in a movement of the upper leg, which causes the lower leg to move, and also causes the foot to rise off the ground. By using physics-based rules, i.e., a physics-based simulation, more accurate video motions can be generated by the simulator than using the hard-coded rules. Physics-based simulations can account for conditions in the surrounding environment, such as changes in gravity, uneven terrain features, and motion interference. Motion interference can be any physical force that disturbs or interferes with the object or character action. Wind, projectiles, terrain changes, another character bumping into or pushing the character whose action is being generated, and other disturbances or interferences are non-limiting examples of motion interference parameters.

Utilizing physics-based simulations can lead to higher quality video portions, such as fewer non-sequitur movements, erratic motions, and less jumpiness than using other simulation methods. Attempting, however, to build rules for the possible physics-based interactions can be difficult and limiting. New game applications can introduce a whole new set of physics-based rules in the game environment such that the time/cost to develop specific rules for each environment can be excessive.

Another method for simulating uses motion capture (MOCAP) video clip objects as a model for how a motion or action is to be performed. MOCAP-based object or character simulation is a common technique in computer applications and games. The object or character can copy the movements of a reference object from the MOCAP video clip and thereby generate a higher quality video portion than using other generation methods. MOCAP is the process where multiple points of reference are marked on a person or object, such as markers spaced evenly around the person or object, and then a video is shot of the person or object performing a motion. The markers can be used as reference points by the simulator to generate the character or object motion.

MOCAP reference object movements can be modified using the physics-based rules. For example, a martial arts movement can be modified if the simulator is using a frozen pond as the terrain for the character. Performing the martial arts movement on the frozen pond can lead to physics-based changes to the character, such as the character slipping or falling down. A character that has fallen down cannot easily continue to match the movement of the reference object. The character has to return to a position close to the reference object in order to continue to simulate the movements of the reference object. Being able to simulate these correction steps and disturbances to the movements while maintaining an acceptable visual quality, e.g., lacking jumpiness or unnatural object or character movement, can be difficult. Merely having the character pop back up to their feet after falling down can lead to a poor user visual experience.

This disclosure describes a method that can use a deep reinforcement learning technique combined with the physics-based MOCAP methods to allow a simulator to generate a higher quality video portion where the movements of the object or character appear smooth and natural, as compared to current conventional techniques. The higher quality video portion applies in cases where the object or character motion diverges from the reference object due to disturbances, such as if a character falls down due to environment or disturbances. The method can also compensate for signal noise in the MOCAP video clip by utilizing the deep reinforcement learning technique to correct for the signal noise and provide additional smoothing of the resulting simulation.

The deep reinforcement learning system uses a neural network (NN), such as a convolutional NN or other types of NNs, to provide analysis and direction on how to modify the movements of an object or character in order to keep it close to mimicking the reference object. This system can be encapsulated, e.g., grouped or wrapped together, as a tracking agent, i.e., tracking controller, where the tracking agent can direct the object or character to track the reference object movements.

If movement of an object or character diverges from the reference object, such as a character falling down, the analysis provided by the deep reinforcement learning system can direct the object or character to move in such a way as to bring the object or character back into an approximate alignment with the reference object, e.g., bringing the object or character into a close enough alignment that the tracking agent can continue its operations. This aspect of the system can be encapsulated, e.g., grouped or wrapped together, as a recovery agent, i.e., recovery controller, where the recovery agent can direct the object or character to return to roughly a position mimicking the reference object at the point where the object or character first diverged from the reference object or at another point of the MOCAP video clip. Both a tracking NN and a recovery NN that is a different NN from the tracking NN can be used.

A computer simulation process can have difficulty modeling under actuated physically based character controls, where the momentum can be changed through contacts with other physical objects. An important issue in character control is to keep a high quality of natural motions, while reproducing a variety of motions and motion styles. For some existing methods that rely on heuristics such as foot placement, Jacobian transpose strategy, base of support, and hard-coded balancing rules, these two requirements can be difficult to balance within the computing simulator. Controlling movement in the presence of external disturbances can increase the difficulty in maintaining a smooth articulated object or character motion, in maintaining a high visual quality, and in continuing to follow the desired outcome of the directed or requested motions.

The simulator can utilize one or more proportional-derivative (PD) controllers with dynamically controlled gain parameters together with corrective joint torques. The target angles, joint positions, applied force parameters, and gain parameters for the PD controllers can be directly derived from the provided motion clip for the simulation step, i.e., a frame of the video scene. Computing the respective gain parameters and the corrective torques of the object or character can utilize the movement agent, such as the tracking agent or recovery agent.

The tracking agent can utilize various observations, for example, observations from open source toolkits, such as RoboSchool, which includes various parameters. The observations can include a parameter set that then can be extended with inputs from the outputs of the previous simulation step and other parameters.

The respective movement agents can be trained with a large store, e.g., database, of MOCAP video clip examples without any additional heuristics. The root of the object or character does not need to be actuated and the PD controller can conserve momentum appropriate to the applied physics rules for the simulated environment. For example, an Earth based simulation can utilize a physics rule that gravity is 9.8 meters per second squared ($m/s^2$) and a Mars based simulation can utilize gravity as 3.711 $m/s^2$.

Employing one of the movement agents to steer the PD controller torque and target angle without using the target angle from the reference object can increase the difficulty of maintaining control of the object or character. This can make the control problem very difficult and effectively limit the variations in motion and motion style that can be faithfully reproduced. In addition, using the PD controller without corrective joint torques typically results in the movement agent directing the object or character to crawl about the ground. The movement agent can fail to balance the object or character and may not properly apply torque to correct the contact forces required to produce the desired movement.

The disclosed method can simulate reference objects sampled from a MOCAP video clip storage with more motions and clips that have not been used during the training of the deep reinforcement learning system. In addition, the deep reinforcement learning system training can be an ongoing process, such that the variety of reproducible motions can be improved with new examples and additional training. Training typically involves moving a character or object using a selected set of MOCAP video clips as movement references for moving the character or object. The training system uses a reward mechanism, e.g., maximizing the rewards, to learn the optimum combination of MOCAP video clips to use as the movement references. Inputs and labeling of inputs are handled internally within the deep reinforcement learning system as it seeks the maximum reward movements. Other solutions using this approach utilize a movement agent simulating one or few reference objects from MOCAP video clips per trained network. Training of the tracking NN can be performed separately from training of the recovery NN.

Training of the tracking NN can be completed by sampling a reference object from a MOCAP video clip and a starting frame of that MOCAP video clip. The remaining portion of the MOCAP video clip can be defined as the MOCAP video clip that is trained and can be considered the initial tracking agent state representation. Additional MOCAP video clips can be selected and combined to make a longer MOCAP video clip. The potential transitions of the reference object between the MOCAP video clips are pre-computed by measuring the root mean square (RMS) positional difference, i.e., error, of the center of mass of the target object in the last frame against the frames generated from the tracking NN parameters. The training algorithm for the tracking NN uses a coordinate system that aligns the yaw angles of the substantial mass portion of the object, such as a character torso, of the target object with the yaw angles of the substantial mass portion of the reference object of the MOCAP video clip. A transition to frames that have an error less than a specified threshold, for example an RMS of 0.1, is rewarded, or rewarded to the frame with a minimum error if no frames have an error less than the specified threshold. Another algorithm can be used to reduce irrelevant data from the tracking NN, such as removing MOCAP video clips from the set of MOCAP video clips utilized as reference objects when those MOCAP video clips are not relevant to the current movement. For example, a MOCAP video clip can be removed when it references movement on a bicycle while the target character is standing with both feet on the floor. For training, other solutions, such as a least square fit frame algorithm can be used in place of the RMS method.

Training of the recovery NN can be completed by randomly picking a frame from the MOCAP video clip as the target MOCAP pose. Similarly, the target object can be initialized to a pose selected at random from the MOCAP video clip. Alternatively, the target object can be initialized to various poses of the target object lying on the floor. Various parameters from the recovery NN can be tried to move the target object toward close alignment with the reference object. The series of movements resulting in the highest reward can be stored as the likely series of movements to utilize during the runtime of the video simulator, and can be considered the initial recovery agent state representation.

The tracking and recovery training processes can use an adaptive optimization step size by controlling the Kullback-Leibler (KL) divergence of the target object between frames of the training process. KL divergence is a measure of how one probability distribution is different from a second, reference probability distribution and is used to measure the differences between two frames of the training data. For example, if the current KL divergence is more than two times a target KL divergence, then the optimization step can be reduced in size by a factor of 1.5. If the current KL divergence is less than half of the target KL divergence, then the optimization step can be increased in size by a factor of 1.5. This approach allows for reduced variance during the training process and allows for more aggressive updates when the KL divergence is small.

The tracking NN rewards and the recovery NN rewards are measures of how close the target object mimics the reference object. The NN rewards, as used herein for the tracking agent, can incentivize the movement agent to achieve a height greater than or equal to that of the reference object. The tracking NN rewards can penalize excessive contact force where the sum of the contact force is computed across the same character body part. The tracking NN rewards can also penalize the movement agent if it causes the target object to fall down prior to the maximum simulation step being reached, for example, when an end state condition is met. A linear fall off for the above tracking NN rewards can be used in place of an exponential fall off since the NN learning for exponential fall off can result in slower learning of the NN.

The NN rewards, as used herein for the recovery agent, are similar to the tracking agent NN rewards. The recovery NN rewards are adjusted so that the recovery agent first modifies the movement of the tracking object to attempt to approximate the height and position of the reference object. When the recovery NN reward for the height and position factors are satisfied (not necessarily matching), then the recovery agent will focus on the orientation and local pose aspects of the target object.

In addition to training a NN, this disclosure demonstrates that the object or character can react to a dynamic environment to some extent, such as disturbances or interferences. For example, using the tracking agent, objects can be randomly thrown at a character to disturb the movement of the character without the character immediately falling down. As long as the simulated character satisfies an imitation threshold, the tracking agent can continue to direct the movements of the character. The tracking agent can utilize the deep reinforcement learning system to provide the gain parameter, torque, and other parameters to the tracking agent to allow the object or character to maintain a close or approximate simulation, i.e., mimicking, of the reference object.

In the situation where the object or character falls down or where the movement diverges significantly from the reference object, such as failing to satisfy a stability threshold, the recovery agent can be utilized to direct the character to move back close to the desired pose of the reference object at the point where the character diverged from the MOCAP video clip, e.g., bringing the object or character back to a position to satisfy the stability threshold allowing the tracking agent to take over modifying the character movement from the recovery agent. Alternatively, the recovery agent can utilize the reference object from a subsequent frame of the MOCAP video clip as the desired target pose. The imitation threshold and the stability threshold can be parameters provided by the simulation system, the MOCAP video clip storage, the requesting application (e.g., requesting the MOCAP imitation), or from other sources.

The target object movements occur across one or more simulation steps. The physics simulator can use a simulation step to determine the target object frame for the current scene. The physics simulator can use a parameter, such as frames per second (FPS), to indicate how many target object frames should be generated, e.g., rendered, per second for output to the renderer. Typical ranges of the FPS can be 60 FPS to 120 FPS, though physics simulators can use a lower or higher FPS. This means that the physics simulator can output between 60 to 120 updates to the target object frame each second. Each time the physics simulator increments the simulation step, new information can be calculated for moving the target object using the movement from the incremented MOCAP video clip frame, movement modifications from the target agent, and the movement from the recovery agent.

The methods and systems described herein, e.g., motion correctors, can be utilized in various applications and systems. For example, in a video game, the motion correctors can be used to generate motion that responds to other objects within the video game. The motion imitation can apply to characters, animals, and objects within the environment. The rendered video clip can have an increased realism as compared to a video clip of pre-rendered animation. In a second example, the motion correctors can be used for autonomous vehicles. Simulations of a vehicle interacting with a human can be conducted, such as a crash between the vehicle and human. The motion correctors can be used to help determine how the human will react and move in various situations so that the autonomous vehicle can select an action that would minimize the damage and harm to the human. The deep reinforcement learning system for the autonomous vehicle can be trained on how best to maneuver in these emergency situations. Also, by example, the motion correctors can be utilized to simulate how a human or animal responds to external stimuli, and when compared to an observation of an actual physical event, decisions can be made to improve the interaction.

Turning now to the figures, FIG. 1 is an illustration of a block diagram of an example simulation system 100 that uses a MOCAP video clip as a model to simulate the movements of a target object. Simulation system 100 includes a video generator 108 and a MOCAP storage 105 to store MOCAP video clips. Video generator 108 includes a physics simulator 110 and NN 120. Simulation system 100 can identify a MOCAP video clip from MOCAP storage 105 to use as a model for a tracking agent of the target object. The MOCAP video clip can be a general MOCAP video clip or a specific MOCAP video clip, e.g., a general human running or a more detailed adult six-foot male running at a specific speed of 1.5 m/s.

Physics simulator 110 can employ the tracking agent and the recovery agent to move the target object to match the movements of a reference object of the MOCAP video clip, while enforcing the physics-based constraints of the environment of the target object. Physics simulator 110 can receive joint angles of the reference object which a PD controller of physics simulator 110 employs as target angles for controlling and moving the target object. Physics simulator 110 can also receive an imitation threshold parameter and a stability threshold parameter that are employed to control the target object. Physics simulator 110 also employs joint torques, joint positionings, applied forces, PD controller gain parameters, and other NN parameters received from NN 120 for controlling the target object. Physics simulator 110 can output the rendered target object to a renderer, such as at the end of the simulation step. The renderer can utilize the rendered target object and combine it with other environment data and scene data to create the final rendered scene to be output, such as to a display, printer, storage device, data center, cloud environment, server, and other computing systems.

NN 120, e.g., deep reinforcement learning algorithms located as part of a deep learning system, provides the NN parameters utilizing the target body information from physics simulator 110 and frame data of the reference object. The target body information includes poses, angular velocity of bodies, and NN rewards.

Figure 5:
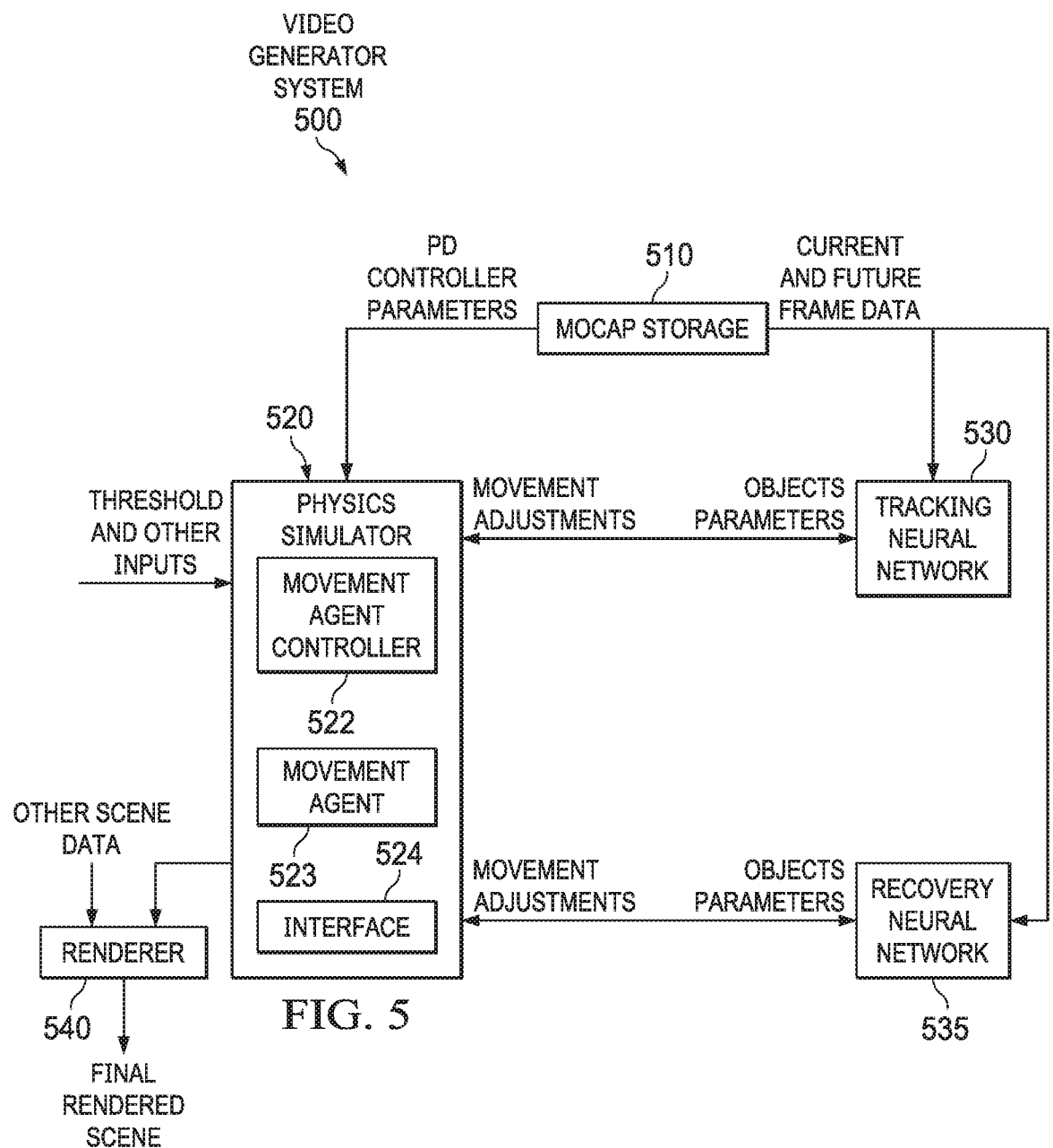
FIG. 5 is an illustration of a block diagram of an example video generator system.

As discussed more in FIG. 5, NN 120 can include one or more NNs, such as a tracking NN and a separate recovery NN. A tracking agent utilizes the tracking NN to track and adjust the movement of the target object to substantially match the motion of the reference object. While the target object satisfies the imitation threshold, the tracking agent can continue to move and adjust the movement of the target object. The target object satisfaction can be computed by comparing the imitation threshold parameter to the orientation of the target object as projected against the reference object. If the imitation threshold is not satisfied and the target object satisfies the stability threshold, the tracking agent can bring the target object back to a position that satisfies the imitation threshold. The target object satisfaction can be computed by comparing the stability threshold parameter to the orientation of the target object as projected against the reference object. The movement can approximate the reference object movement and does not need to be an exact duplicate.

A recovery agent utilizes the recovery NN when there is a failure to satisfy the stability threshold. For example, failure to satisfy the stability threshold can occur when the target object falls down at a point in time where the reference object remains standing. This can occur due to physics-based environmental factors within the simulation environment, such as when the target object is standing on ice, or due to other physics-based factors, such as when the reference object exhibits muscle flexibility much greater than the muscle flexibility designated for the target object. The recovery agent can adjust torque, adjustment angles, applied forces, PD gain parameters, and other NN parameters of the target object to bring the target object back to a position that satisfies the stability threshold at which point the tracking agent can resume tracking the movement of the reference object. When training NN 120, one NN 120 can be actively trained at a time. During an active simulation, the target NN and recovery NN can be active, depending on the target object satisfying the imitation or stability thresholds.

Typically, the environment of the target object does not match the MOCAP video clip environment. The differences in the environment, and disturbances, such as other interfering objects, can cause the target object to not exactly follow the movements of the reference object. This can be measured by the imitation threshold. If the target object satisfies the imitation threshold, then the target object is approximately matching the motions of the reference object to a satisfactory extent and further corrections may not be needed by the tracking agent. If the target object fails to satisfy the imitation threshold and satisfies the stability threshold, then a tracking agent, using the tracking NN, can be utilized to provide corrections and adjustments to the tracking agent for the movement of the target object, to bring the target object back into substantial alignment with the reference object, i.e., re-satisfy the imitation threshold. NN 120 can provide one or more of the various NN parameters.

If the target object fails to satisfy the stability threshold, then the target object position has moved significantly away from the position of the reference object, for example, when the target object falls when the reference object remains standing. The recovery agent can be utilized, using information from NN 120 to provide the NN parameters, to bring the target object back to a position that satisfies the stability threshold. At this point, the tracking agent can resume tracking the reference object movements.

The target object and reference object can be humanoid, robotic, animal, or other types of objects capable of movement via joints and articulations, and capable of interacting with their simulated environment. The target object and the reference object should be a similar type of object. The closer the object type, the better the tracking agent can move the target object. For example, if the target object is a human that is a six-foot tall male and the reference object is of a six-foot tall male, then the tracking agent will be able to achieve higher rewards than with other MOCAP video clips. If the reference object is a four-foot tall human then there can be greater differences when accounting for the environmental factors of the target object, needing more balance and recovery corrections. If the reference object is a toddler then the tracking agent would likely have difficulty in satisfying the imitation threshold, resulting in poor tracking ability. If the reference object is a dog, then the tracking agent would likely be rendered ineffectual in tracking the reference object.

Figure 2:
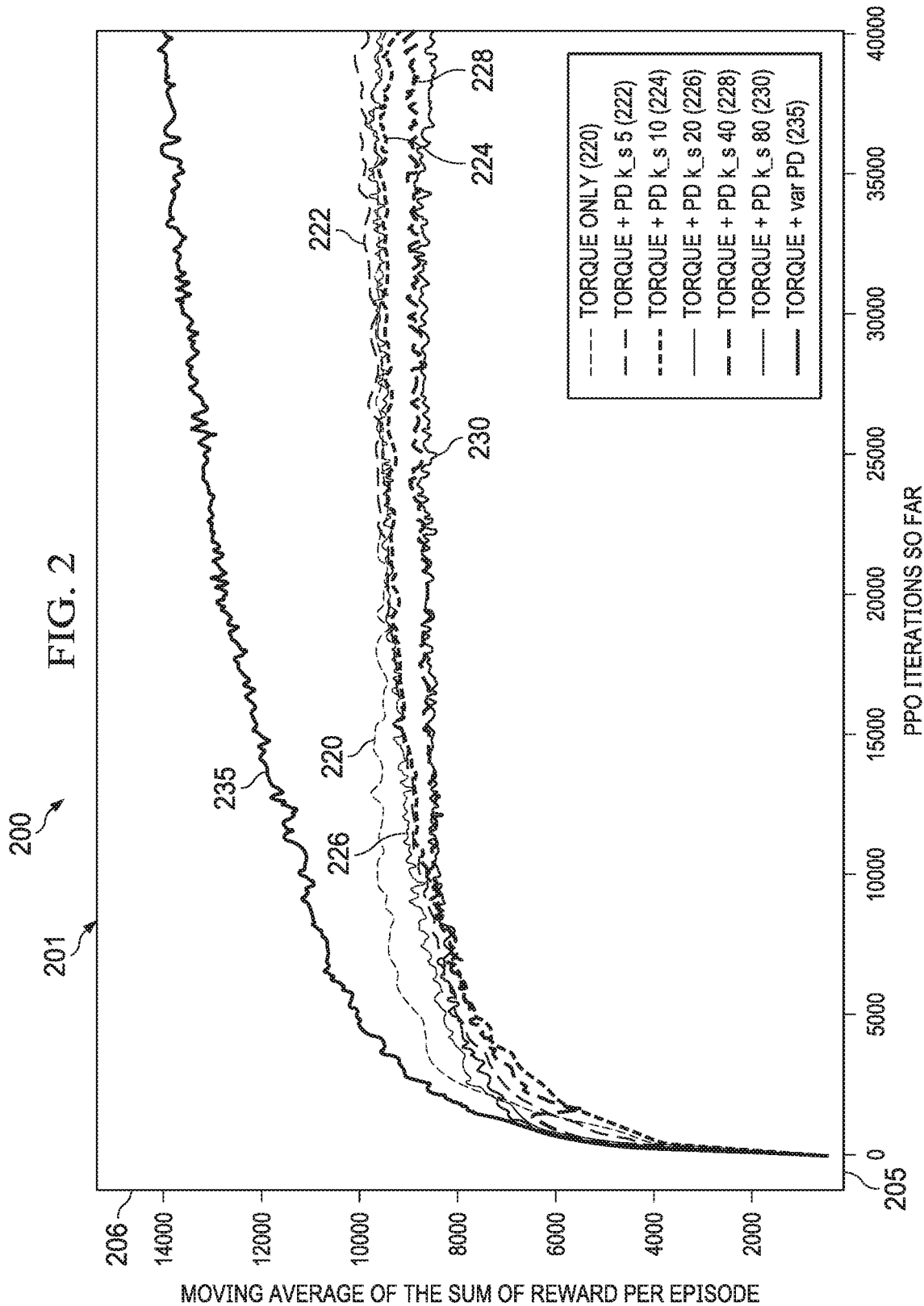
FIG. 2 is an illustration of a chart of an example torque and variable proportional derivative controller comparison.

FIG. 2 is an illustration of a chart of an example torque and variable PD controller comparison 200, demonstrating the relative reward value using different tracking agent methods. Variable PD controller comparison 200 includes chart area 201, an x-axis 205, and a y-axis 206. X-axis 205 represents the proximal policy optimization (PPO) iterations conducted. Y-axis 206 represents the moving average of the sum of the rewards per MOCAP video clip, e.g., per MOCAP video clip episode or portion.

Chart area 201 includes seven line plots demonstrating the differences observed using varying techniques of handling the target object tracking of the reference object. Line plot 220 utilizes torque parameters for tracking. Line plot 222 utilizes torque parameters and a PD controller with a static gain parameter of 5 ($k_s$=5). Line plot 224 utilizes torque and a PD controller with a static gain parameter of 10 ($k_s$=10). Line plot 226 utilizes torque and a PD controller with a static gain parameter of 20 ($k_s$=20). Line plot 228 utilizes torque and a PD controller with a static gain parameter of 40 ($k_s$=40). Line plot 230 utilizes torque and a PD controller with a static gain parameter of 80 ($k_s$=80). Line plot 235 utilizes torque parameters and a PD controller with a variable gain parameter ($k_s$=variable).

Line plots 220, 222, 224, 226, 228, and 230 follow similar curves where at about 5,000 PPO iterations the rewards gained begin to flatten out. Line plot 235, representing the implementation of this disclosure, shows that the reward flattening out occurs much later, around 30,000 PPO iterations, with the overall moving average of the reward values significantly higher than the moving average of the reward values for the other line plots.

Tracking agent methods that use torque corrections only, or torque plus a static PD gain parameter, show a relative flattening of the reward value earlier than when using a variable PD gain parameter. The techniques described herein demonstrate an improvement in the target object matching the reference object over previous methods; under some scenarios a 50.0% improvement can be realized.

Figure 3:
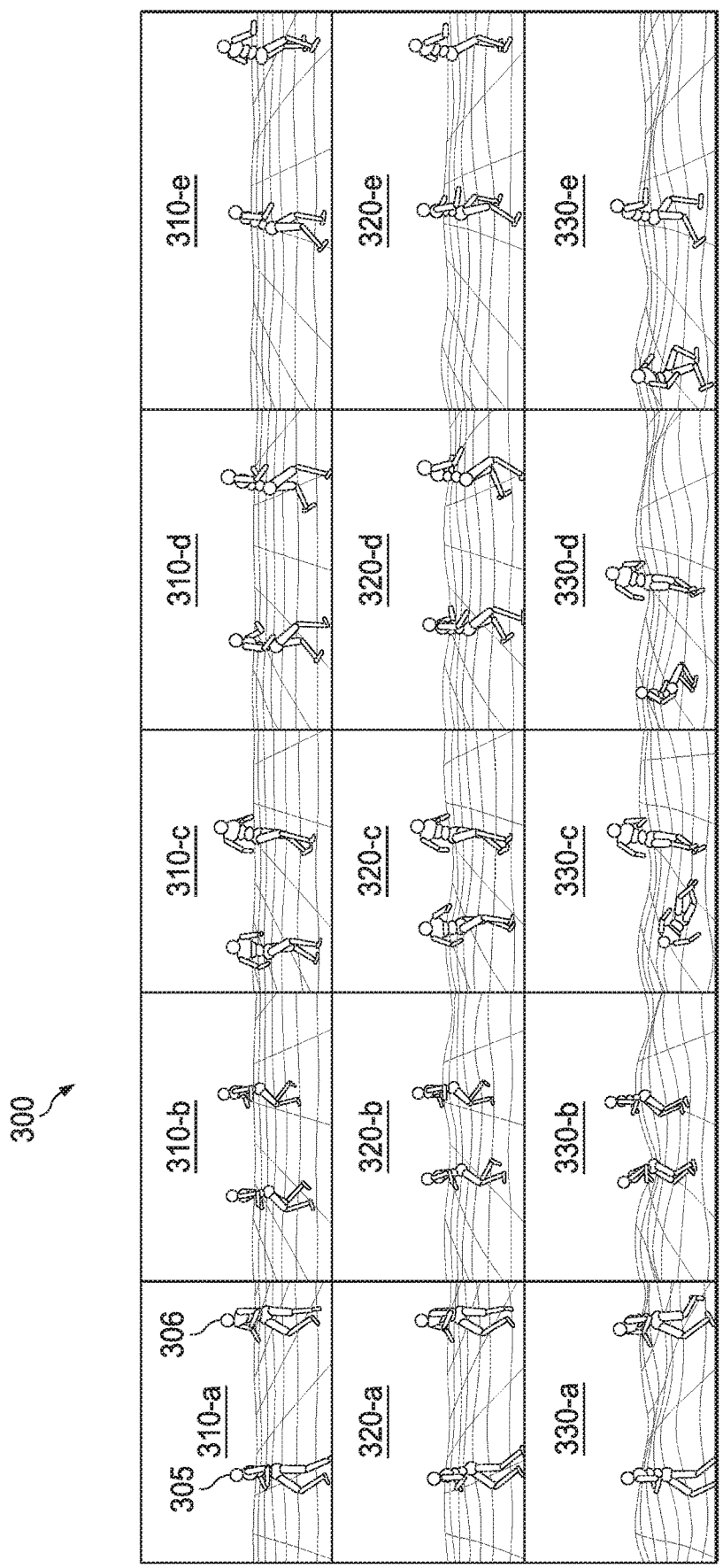
FIG. 3 is an illustration of a diagram of an example target object movement agent process.

FIG. 3 is an illustration of a diagram of an example target object movement agent process 300. Agent process 300 has a series of tracking samples where the left figure is a target object 305 and the right figure is a reference object 306. Agent process 300, or at least a portion thereof, can be performed by a computer program, hardware circuitry, or by a combination thereof. Agent process 300 can be performed by a physics-based simulator implemented as application code executing on a graphic processing unit (GPU), a central processing unit (CPU), other types of parallel or serial processors and processing units, or any combination thereof. For example, agent process 300 can be performed by physics simulator 520 of FIG. 5. The simulation steps used here are for demonstration purposes and are significantly larger than what would be used by a typical physics-based simulator when rendering images. The physics-based simulator would render the tracking samples at an FPS that would provide at least a satisfactory visual quality metric for a user. The tracking samples herein have a larger simulation step time gap in order to clearly show the differences in the movements of target object 305.

Tracking samples 310-a, 310-b, 310-c, 310-d, and 310-e, collectively referred to as tracking samples 310, demonstrate the target object 305 on a relatively flat terrain. Target object 305 is able to match reference object 306 with minimum corrections. In tracking samples 310, target object 305 does not fail to satisfy the imitation threshold.

Tracking samples 320-a, 320-b, 320-c, 320-d, and 320-e, collectively referred to as tracking samples 320, demonstrate target object 305 on a relatively medium roughness terrain. At tracking sample 320-c, target object 305 has fallen behind reference object 306 and has failed to satisfy the imitation threshold (the target object is leaning backwards while the reference object is leaning forwards), such that a comparison of the imitation threshold parameter with the target object orientation projected against the reference object orientation can be computed. Balance correction joint torques, gain parameter, and other NN parameters for the PD controllers is supplied to the tracking agent from the tracking NN to bring target object 305 into approximate alignment as shown in tracking sample 320-d. Tracking sample 320-e shows target object 305 again in approximate alignment with reference object 306 and normal tracking movement continues.

Tracking samples 330-a, 330-b, 330-c, 330-d, and 330-e, collectively referred to as tracking samples 330, demonstrate the target object 305 on a relatively rough terrain. By tracking sample 330-b, the terrain disturbance to target object 305 has begun to affect the balance of target object 305. In tracking sample 330-c, target object 305 has fallen down, thereby failing to satisfy the stability threshold, such that a comparison of the stability threshold parameter with the tracking object orientation projected against the reference object orientation can be computed.

Figure 6:
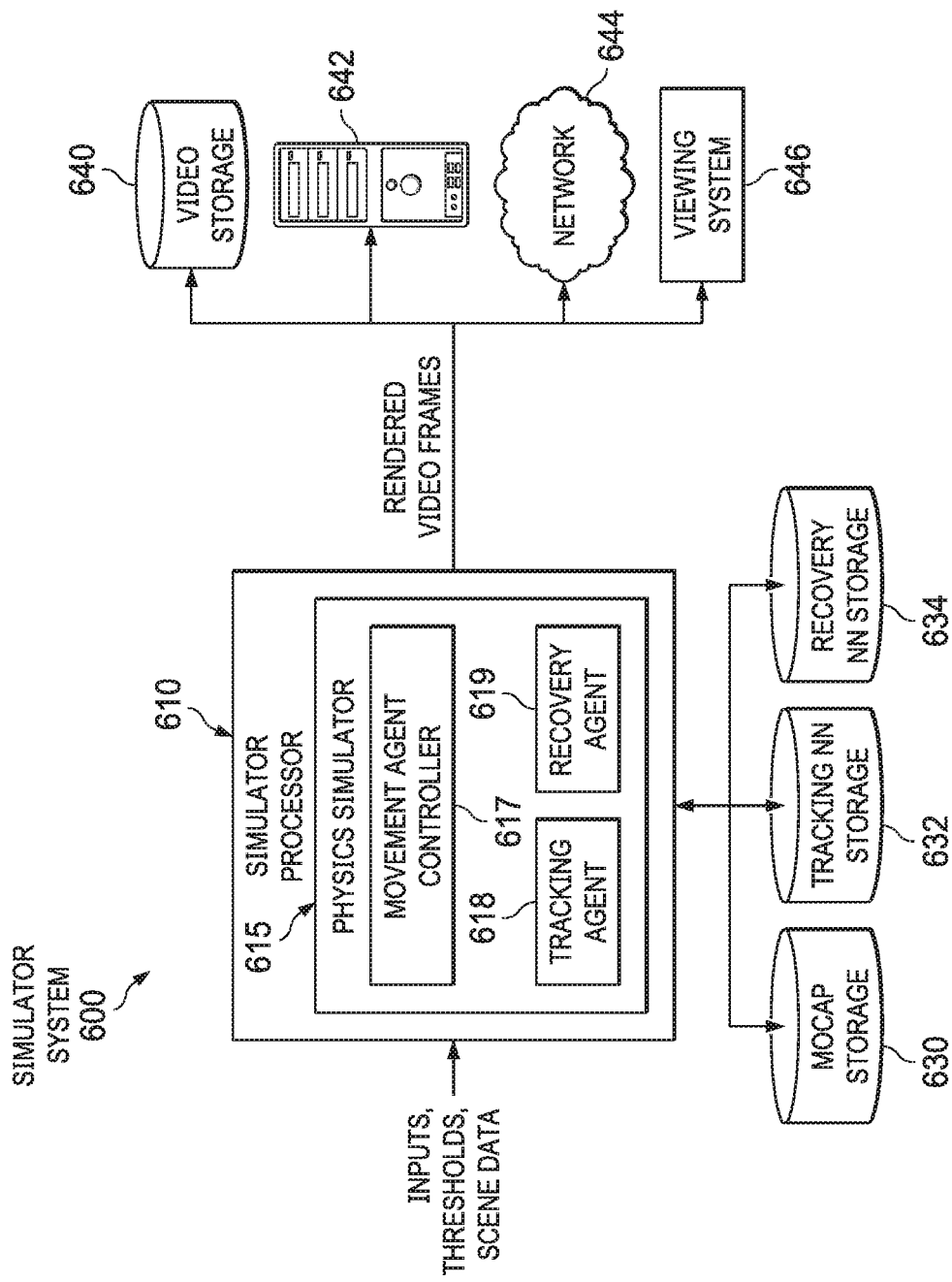
FIG. 6 is an illustration of a block diagram of an example simulator system.

The physics-based simulator can include the tracking agent and the recovery agent and can switch from using the tracking agent to using the recovery agent when the stability threshold fails to be satisfied. The tracking agent and recovery agent can be one or more processes, functions, modules, libraries, dynamic link libraries (DLL), and other application code and logic processing constructs executing on one or more processors, such as one or more GPUs. Physic simulator 610 of FIG. 6 provides an example of a physics-based simulator that includes both a tracking agent and a recovery agent.

The recovery agent can bring target object 305 back into an approximate alignment with reference object 306, thereby satisfying the stability threshold. Tracking sample 330-d shows the recovery agent in progress to move target object 305 using physics-based constraints to move the target object to a standing position. Reference object 306 has not progressed between tracking samples 330-c and 330-d, e.g., the reference frames for reference object 306 have not been incremented. In tracking sample 330-e, target object 305 has satisfied the stability threshold as target object 305 is in the process of standing up. Since the stability threshold is satisfied, the recovery agent can return control to the tracking agent within the physics-based simulator. Reference object 306 video clip reference frame can be advanced, and the tracking agent can continue to bring target object 305 into approximate alignment with reference object 306 to further satisfy the imitation threshold.

Figure 4A:
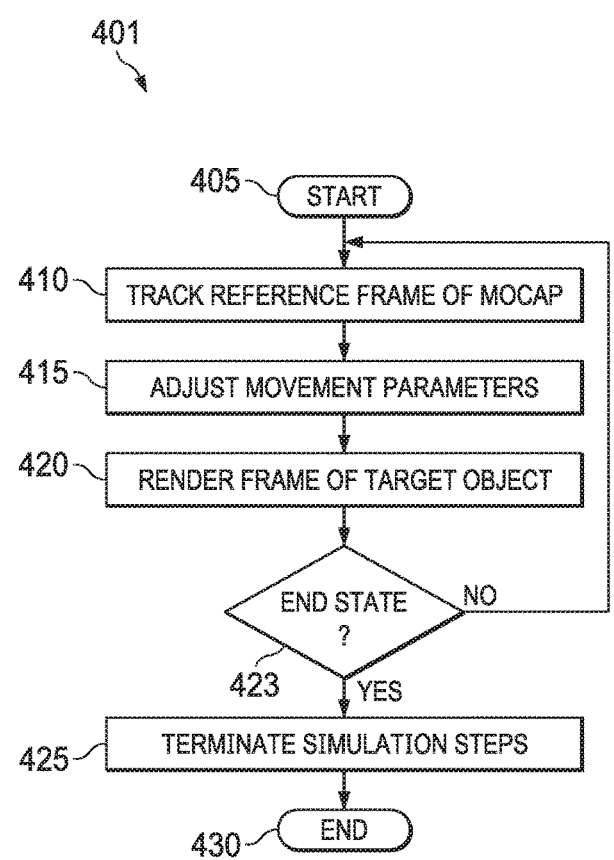
FIG. 4A is an illustration of a flow diagram of an example method for imitating a motion capture clip.

FIG. 4A is an illustration of a flow diagram of an example method 401 for imitating a reference object. Method 401 utilizes a trained NN to provide input to a tracking agent to adjust movement of a simulated object. Method 401, or at least some of the steps of method 401, can be carried out by a computer system capable of executing a simulator and interacting with a NN, for example, the computer system as shown in FIG. 5. Method 401 starts at step 405 and proceeds to step 410. In step 410, a reference frame of a reference object is received and the angle and joint positionings are used by the tracking agent to move the target object. In step 415, the tracking agent utilizes NN parameters from the tracking NN to provide movement corrections, such as torque corrections and variable gain parameters for the PD controllers, to continually move the target object to be a closer match to the movements of the reference object.

In step 420, the frame of the target object is rendered for the simulation step, along with other objects, scenery, images, and other content. The frame can be output to a display, monitor, intranet, internet, server, cloud storage, data center, or storage device for viewing or playback.

In step 423, a determination is made if an end state has been reached. An end state can be a number of simulation steps, i.e., frames, a time limit, a satisfaction of a parameter from an application (for example, the user moves the target object or issues a command, the target object achieves a goal, such as reaching a destination or completing a dance move), or another end state parameter as directed by the requesting application. If an end state has not been reached, method 401 increments the simulation step and method 401 loops back to step 410. If an end state has been reached, method 401 continues to step 425 where the simulation steps are terminated. Method 401 ends at step 430.

Figure 4B:
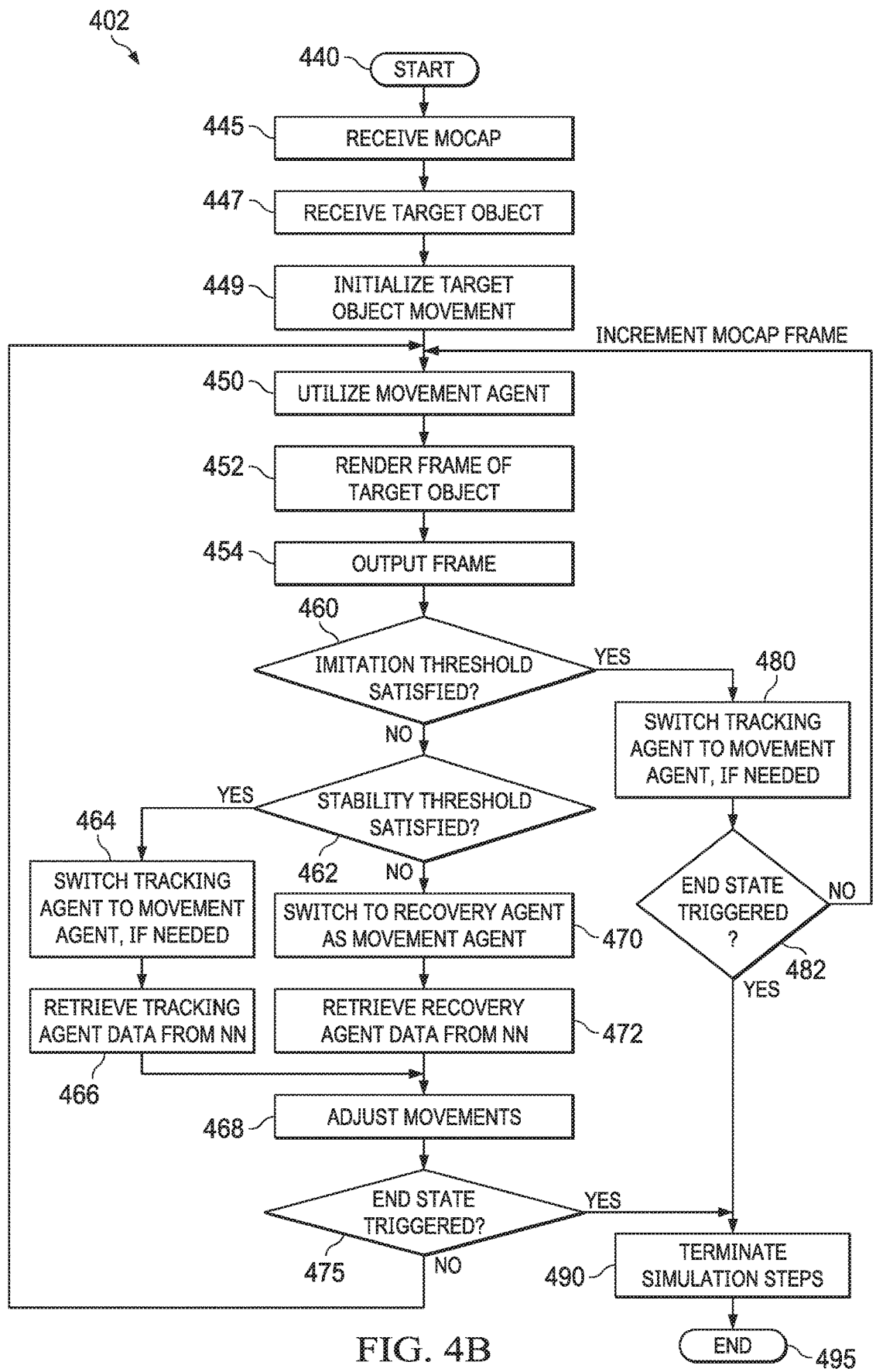
FIG. 4B is an illustration of a flow diagram of an example method for tracking a motion capture clip.

FIG. 4B is an illustration of a flow diagram of an example method 402 for tracking a reference object of a MOCAP video clip. Method 402 is an alternative aspect with additional details from method 401. Method 402 advantageously utilizes both a tracking NN and a recovery NN, and is capable of switching between a tracking agent and a recovery agent utilizing imitation and stability threshold parameters. Method 402, or at least some of the steps of method 402, can be carried out by a computer system, for example, as shown in FIG. 5. Method 402 starts at step 440 and proceeds to step 445. In step 445, a physics simulator receives the selected MOCAP video clip from a MOCAP storage, such as a database, server, cloud storage, data center, and other storage locations.

In step 447, the physics simulator receives the target object information. The information can include, for example, the physics parameters of the object, such as the type of object or character that is being moved, the height, stride, arm length, and other target object characteristics. The target object information can also include the environment characteristics within the scene where the target object is located, such as the characteristics of the surface of the ground, the air, and other surrounding spaces. Additionally, the target object information can include potential disturbances, for example, objects being thrown at the target object, rain, sleet, wind, and other disturbances. The target object information can further include the physics-based constraints to be applied to the target object, for example, the force of gravity.

In step 449, the target object movement is initialized by establishing the tracking agent as the movement agent. Initializing the target object movement begins with the target object satisfying the imitation threshold. Method 402 proceeds to step 450. In an alternate aspect, where the target object starts with not satisfying the imitation threshold, then method 402 can jump to decision step 462.

In step 450, the movement agent is utilized to adjust movement of the target object. The movement agent can retrieve new joint angles, positionings, and other constraint information from the reference object and apply that information to the target object using the physics simulator; whereby the physics-based constraints can be enforced. In step 452, the target object is provided to a renderer which can combine the target object information with environment data and scene data to generate a final rendered scene or video frame. In step 454, the renderer can output the final rendered scene or video frame to another system, for example, a display, monitor, storage device, communications link, intranet, internet, and other computing systems.

In decision step 460, a determination is made if the imitation threshold is satisfied. Decision step 460 determines whether movements of the target object satisfy the imitation threshold parameter so that the normal tracking agent can continue to operate on the target object for the next simulation step. The determination can be computed by comparing the imitation threshold parameter with the tracking object orientation projected against the reference object orientation. If the imitation threshold is satisfied, method 402 proceeds to step 480. If the imitation threshold is not satisfied, method 402 proceeds to decision step 462.

In decision step 462, a determination is made if the stability threshold is satisfied. Decision step 462 determines whether the target object is within the stability threshold, for example, the stability threshold parameter can be compared to the orientation of the target object. If within the stability threshold, then the tracking agent can move the target object toward a position that satisfies the imitation threshold. If not within the stability threshold, then a recovery agent needs to take over moving the target object for the next simulation step. As such, if the stability threshold is not satisfied in step 462, method 402 proceeds to step 470. If the stability threshold is satisfied in step 462, method 402 proceeds to step 464.

In step 464, the tracking agent is assigned as the movement agent when the movement agent is presently the recovery agent. This step is executed if the movement agent had been reassigned as the recovery agent in a previous simulation step—due to, for example, the stability threshold being unsatisfied. When the tracking agent is already being used as the movement agent, method 402 can continue to step 466. At step 466, the tracking agent retrieves data from the tracking NN to assist the tracking agent in modifying the movements as dictated by the reference object to bring the target object into closer alignment with the reference object. The retrieved data can include joint angles, positionings, PD gain parameters, applied forces, and other NN parameters, for example, pushing harder with the left leg of the target object.

In step 468, the retrieved data can be applied to the target object to modify the movements of the target object. The modifications to the movements as provided by the reference object are to move the target object in such a way as to mimic the reference object while reducing the alignment gap, e.g., satisfying the imitation threshold. Proceeding to decision step 475, a determination is made if an end state condition has been met. The physics simulator can verify when an end state condition has been met. End state conditions can vary and can be defined by different systems. An end state can be from the MOCAP video clip, such as when there are no remaining frames to mimic. The application requesting the mimicking of the reference object can also provide an end state, such as when a goal is reached or when the user performs an action that changes the program parameters. End states, such as a notification, flag, or another indicator signifying that the mimicking process should terminate can be established and received from other systems, too. If the output is "no" in step 475, then method 402 returns to step 450 and the simulation step is incremented. If the resultant is "yes", then method 402 proceeds to step 490 wherein the simulation steps are terminated.

Returning to step 470, the recovery agent is assigned as the movement agent. The recovery agent will control the movement of the target object until a time when the tracking agent can take over. Increments of the MOCAP video clip frames are stopped until the tracking agent can take over the movement of the target object. In step 472, the recovery agent retrieves data, such as data parameters, from the recovery NN to assist the recovery agent in modifying the movements of the target object to bring the target object into a position where the tracking agent can take over. The retrieved data parameters can include joint angles, positionings, PD gain parameters, applied forces, and other NN parameters, such as, pushing with the left hand against the ground to make the target object stand back up. Method 402 proceeds to step 468.

Returning to step 480, similar to step 464, the tracking agent can be assigned as the movement agent when the recovery agent is presently assigned as the movement agent. Method 402 can continue to decision step 482 when the recovery agent is not presently assigned as the movement agent. In decision step 482, the end state conditions are verified. Step 482 is similar to decision step 475. If the resultant is "no", then method 402 proceeds to step 450 and the simulation step is incremented along with incrementing the MOCAP video clip to the next reference frame. Incrementing the MOCAP video clip provides for the next frame of the reference object to be utilized to direct the movement of the target object for the next rendered frame of the scene. If the resultant is "yes", then method 402 proceeds to step 490 wherein the target object no longer attempts to mimic the reference object and the simulation process ends. Method 402 ends at step 495.

FIG. 5 is an illustration of a block diagram of an example video generator system 500 constructed according to the principles of the disclosure. Video generator system 500 is configured to render a video that includes a target object whose movements are tracking a reference object from a MOCAP video clip. Video generator system 500 includes a MOCAP storage 510, a physics simulator 520, a tracking NN 530, a recovery NN 535, and a renderer 540. Renderer 540 can be implemented on a GPU, CPU, or another type of processor. Renderer 540 can combine the output from physics simulator 520 with other scene data and environment data to generate a scene or image, such as the final rendered scene, that can be output to another device such as a display, monitor, printer, storage, and communication devices.

MOCAP storage 510 can be a memory, database, server, data center, cloud environment, and other types of computing storage systems capable of storing one or more MOCAP video clips. Physics simulator 520 includes a movement agent controller 522, a movement agent 523, and an interface 524. Physics simulator 520 can utilize physics-based parameters and constraints to render frames of video. Physics simulator 520 can receive a MOCAP video clip and associated information from MOCAP storage 510, as well as threshold parameters and other environment data of the scene, such as weather, interference objects, and other potential disturbances, from a requesting application, and proceed to move a target object mimicking the reference object.

Physics simulator 520 can work in conjunction with tracking NN 530 and recovery NN 535 to adjust the movements of the target object to match the movement of the reference object. Both tracking NN 530 and recovery NN 535 can be active during simulating whereas only one of the tracking or recovery NN can be active during training. For the simulation step, the frame of the target object can be output to a renderer 540 to render the final rendered scene. The simulation step is then incremented, and, when a recovery agent is not utilized as movement agent 523, the MOCAP video clip is incremented so that the next MOCAP video clip frame is used as the reference object to guide the movement of the target object. For the simulation steps, renderer 540 can include the target object frame with other scene data, objects, and images to create a final rendered scene to be output to a display, monitor, storage, intranet, internet, and other transmission and computing systems.

Interface 524 is configured, i.e., designed and constructed, to communicate data. Accordingly, interface 524 includes the necessary circuitry and logic to transmit and receive data. Physics simulator 520 uses interface 524 to communicate with MOCAP storage 510, tracking NN 530, recovery NN 535, and renderer 540.

Movement agent controller 522 is configured to move the target object by employing movement agent 523. Movement agent controller 522 can assign movement agent 523, utilizing the imitation and stability threshold parameters, to be the tracking agent or the recovery agent, such as tracking agent 618 or recovery agent 619 of FIG. 6. Movement agent controller 522 can also assign movement agent 523 to be another type of movement agent. For example, a direct movement agent can be used which utilizes the reference object and where no further movement adjustments are needed.

Video generator system 500 can use tracking NN 530 and recovery NN 535 to correct the movements of the target object should the target object position and orientation diverge from the reference object. Tracking NN 530 can be utilized by the tracking agent to provide torque, joint positionings, forces, gain parameters, and NN physics-based movement parameters to modify the movements of the target object to bring the target object in closer alignment with the reference object, in situations where the imitation threshold is not satisfied and the stability threshold is satisfied. Recovery NN 535 can be utilized by the recovery agent to provide torque, joint positionings, forces, gain parameters, and other NN physics-based movement parameters to move the target object back into an alignment that will satisfy the stability threshold so that the tracking agent can take over modifying the movement of the target object. Tracking NN 530 and recovery NN 535 can be combined into one or more NNs, or be separate neural networks. Tracking NN 530 and recovery NN 535 can be the same or different types of NNs, such as convolutional NN, sparse NN, deep feed forward NN, and other types of NN and deep reinforcement NN.

Physics simulator 520 can also use the tracking agent to move the target object differently than the reference object, as long as the movement is within a movement differential parameter. The tracking agent can blend two or more corrective movements received from the tracking NN and utilize the blended resultant to direct the movement of the target object in an action that is not represented by a previously trained MOCAP video clip. For example, the tracking agent can simulate the target object running at 1.0 meter per second when using a trained first MOCAP video clip of a reference object running at 0.5 meters per second and a trained second MOCAP video clip of a reference object running at 1.5 meters per second. The data from the tracking NN 530 can be used to compensate for the movement differential parameter.

Figure 7:
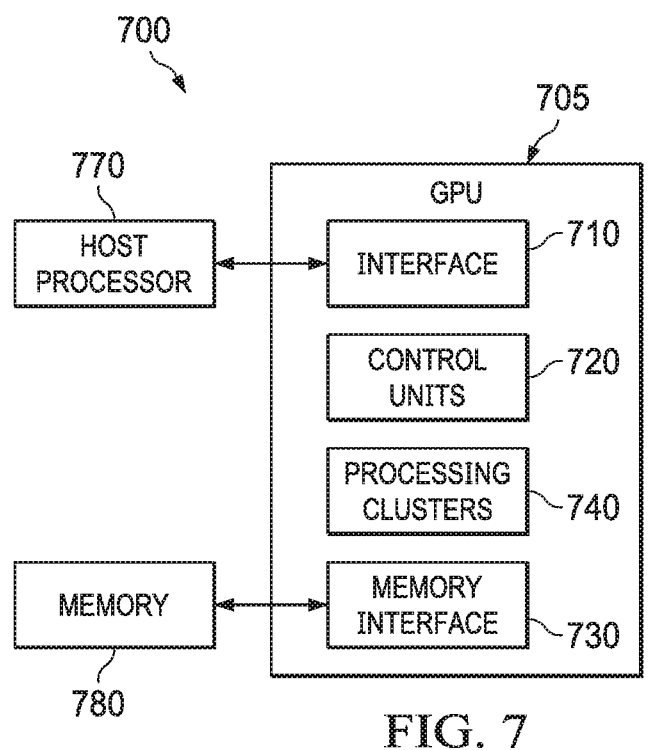
FIG. 7 illustrates a block diagram of an example of a computing system in which at least a portion of the disclosed systems, methods, or apparatuses disclosed herein can be implemented.

Physics simulator 520 can execute on one or more processors, such as parallel processors or serial processors. As such, physics simulator 520 can execute on GPUs, on one or more CPUs, or a combination thereof. In one example, physics simulator 520 can execute on one or more GPUs that include an I/O interface and multiple processing cores. The GPU may be connected to a host processor or other GPUs via one or more interconnects, such as high-speed interconnects. The GPU may also be connected to a local memory having multiple memory devices. FIG. 7 includes an example of a GPU that may be employed.

Tracking NN 530 and recovery NN 535 can be run in parallel with physics simulator 520, such as on the same or different GPUs, CPUs, and other processor types configured to implement layers of a NN. In some examples, the processing cores of a GPU can be configured to implement tracking NN 530 and recovery NN 535.

Physics simulator 520 can implement application logic to interact with logic of tracking NN 530 and recovery NN 535 using one or more of various conventional protocols. Tracking NN 530 and recovery NN 535 logic can be stored in an application DLL, a graphics library, an application code, an application function or module, as code embedded in circuitry or ROM, or other application storage locations and methods. Tracking NN 530 and recovery NN 535 logic can be referenced, e.g., instantiated, by physics simulator 520 using an application call, a code reference, code incorporation at build time or runtime, and by other standard instantiation times.

FIG. 6 is an illustration of a block diagram of an example simulator system 600. Simulator system 600 can be one or more computing systems that are communicatively coupled. For example, one or more CPU cores or one or more networked servers. Simulator system 600 demonstrates one embodiment of a system that can receive a request to render a video frame, or multiple video frames, using a MOCAP as a reference for a target object's movement, and subsequently output the rendered video frames.

Simulator system 600 includes a simulator processor 610 communicatively coupled to a MOCAP storage 630, a tracking NN storage 632, and a recovery NN storage 634. Simulator processor 610 includes a physics simulator 615 having a movement agent controller 617, a tracking agent 618, and a recovery agent 619. Simulator processor 610 can execute on a computing system including a server, tablet, laptop, desktop, mobile device, smartphone, cloud environment, data center, gaming console, virtual reality (VR) device, and other types of computing systems. In addition, in some aspects simulator processor 610 can execute on more than one networked computing system. The computing system can include one or more processing units, such as one or more CPUs with one or more processing cores, one or more GPUs with one or more processing cores, and one or more other processor types. FIG. 7 illustrates one example of a computing system in which at least a portion of the simulator system 600 can be embodied.

Simulator processor 610 can receive various inputs, such as the imitation threshold and stability threshold parameters, the type of target object or character to be rendered, the type of MOCAP movement to be referenced, and other scene data. The simulator processor 610 can initiate physics simulator 615, which can be application code represented in software or hardware, represented by dedicated hardware circuitry, or a combination thereof. Movement agent controller 617, utilizing the methods described herein, can initiate the execution of tracking agent 618 and recovery agent 619. Tracking agent 618 and recovery agent 619 can execute partially or wholly on a GPU or GPUs of the computing system. Tracking agent 618 and recovery agent 619 can execute on different GPUs of the computing system.

Physics simulator 615 can receive data from MOCAP storage 630, such as receiving the MOCAP video clip containing the reference object. As physics simulator 615 executes according to the methods described, one or more of the thresholds can fail to be satisfied. When these execution conditions occur, physics simulator 615, using the respective tracking agent 618 or recovery agent 619, can communicate with respective tracking NN storage 632 and recovery NN storage 634 to receive indicators and recommendations of movement adjustments for use to bring the target object closer in alignment with the reference object. MOCAP storage 630, tracking NN storage 632, and recovery NN storage 634 can be a database, hard disk, memory, cloud storage, data center storage, server, and other storage structures.

As the physics simulator 615 completes rendering a frame of video, the frame of video can be output to one or more other systems. The rendered video frame can be output to a video storage 640, a local network device 642, a distant network device 644, and a viewing system 646. Video storage 640 can be a database, hard disk, memory, cloud storage, data center storage, server, and other storage structures. Local network device 642 can be one or more devices communicatively coupled to simulator processor 610 using a local network, such as a server, computing system, and other network devices. Distant network device 644 can be one or more devices communicatively coupled to simulator processor 610 using a distant network, such as the Internet or a private network system. Viewing system 646 can be a display, monitor, printer, VR display, and other viewing systems capable of showing the video frames.

FIG. 7 illustrates a block diagram of an example of a computing system 700 in which at least a portion of the disclosed systems, methods, or apparatuses disclosed herein can be implemented. Computing system 700 provides an example of a parallel processing unit, GPU 705, included in a system with one or more other devices. Computing system 700 can be embodied on a single semiconductor substrate and can include other devices such as additional GPUs. GPU 705 can be coupled to the additional GPUs via one or more interconnects, such as high-speed interconnects. In FIG. 7, GPU 705 is coupled to a host processor 770 and a memory 780. Host processor 770 can be a CPU and memory 780 can include multiple memory devices. GPU 705 includes an interface 710, control units 720, a memory interface 730, and processing cluster 740. GPU 705 can include additional components that are not illustrated but typically included in a GPU, such as communication busses and interconnects.

Interface 710 is an input and output interface configured to communicate data, commands, and other information, with external components, such as host processor 770. Interface 710 can transmit and receive data and commands over conventional interconnects. Received communications can be sent to the various components of GPU 705, such as control units 720. Control units 720 are configured to manage processing streams, configure processing cluster 740 for processing tasks defined by the streams, distribute the tasks to processing cluster 740, and manage the execution of the tasks on processing cluster 740. The results generated by the tasks can be directed to memory interface 730. Memory interface 730 is configured to store the results in a memory, such as memory 780. In addition to writing to memory 780, memory interface 730 is also configured to read data from memory 780.

Processing cluster 740 includes multiple processing cores for processing the tasks. The processing cores can be optimized for matrix math operations and can be employed for training NNs, such as the tracking and recovery neural networks disclosed herein. Processing cluster 740 can include a pipeline manager that directs the operation of the processing cores for parallel processing of the tasks. Processing cluster 740 can also include additional components for processing the tasks, such as a memory management unit.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip.

The processors or computers can be part of GPU racks located in a data center. The GPU racks can be high-density (HD) GPU racks that include high performance GPU compute nodes and storage nodes. The high performance GPU compute nodes can be servers designed for general-purpose computing on graphics processing units (GPGPU) to accelerate deep learning applications. For example, the GPU compute nodes can be servers of the DGX product line from Nvidia Corporation of Santa Clara, Calif.

The compute density provided by the HD GPU racks is advantageous for AI computing and GPU data centers directed to AI computing. The HD GPU racks can be used with reactive machines, autonomous machines, self-aware machines, and self-learning machines that all require a massive compute intensive server infrastructure. For example, the GPU data centers employing HD GPU racks can provide the storage and networking needed to support large-scale deep neural network (DNN) training, such as for the NNs disclosed herein.

The NNs disclosed herein include multiple layers of connected nodes that can be trained with input data to solve complex problems. For example, the reference objects of a MOCAP video clip can be used as input data for training of the tracking NN and the recovery NN. Once the NNs are trained, the NNs can be deployed and used to identify and classify objects or patterns in an inference process through which a NN extracts useful information from a given input.

During training, data flows through the NNs in a forward propagation phase until a prediction is produced that indicates a label corresponding to the input. When the NNs do not correctly label the input, errors between the correct label and the predicted label are analyzed, and the weights are adjusted for features of the layers during a backward propagation phase that correctly labels the inputs in a training dataset. With thousands of processing cores that are optimized for matrix math operations, GPUs such as noted above are capable of delivering the performance required for training NNs for artificial intelligence and machine learning applications.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method of imitating a reference object from a motion capture (MOCAP) video clip using a physics simulator and a neural network (NN), comprising:
   tracking the reference object using a movement agent of a target object; and
   adjusting a movement of the target object using a stability threshold and the movement agent, wherein the movement agent utilizes an output from the NN to provide modifications to the movement,
   wherein the output is indicative of at least one of: one or more joint torques, one or more joint positionings, one or more applied forces, or one or more proportional derivative (PD) controller gain parameters, and
   wherein the NN is at least one of a tracking NN or a recovery NN and the adjusting further comprises assigning a tracking agent as the movement agent and the tracking NN as the NN, when the stability threshold is satisfied.

2. The method as recited in claim 1, wherein the output from the NN is generated utilizing at least one of: simulation environment data, motion interference parameters, or target object information.

3. The method as recited in claim 1, wherein the adjusting further comprises:
   assigning a recovery agent as the movement agent and the recovery NN as the NN, when the stability threshold is not satisfied.

4. The method as recited in claim 1, further comprising terminating the tracking when an end state is satisfied, wherein the end state is at least one of: a number of simulation steps, a number of frames of the MOCAP, or a satisfaction of a goal of the target object.

5. The method as recited in claim 1, wherein the NN has not been trained using the MOCAP.

6. The method as recited in claim 1, further comprising compensating for signal noise within the MOCAP utilizing the movement agent and the NN.

7. The method as recited in claim 1, further comprising adjusting the movement of the target object utilizing a movement differential parameter.

8. The method as recited in claim 1, wherein the physics simulator executes on one or more graphics processing units (GPU).

9. The method as recited in claim 1, further comprising, selecting movement adjustments for the movement agent from the NN utilizing a combination of a tracking agent state representation, a recovery agent state representation, and NN rewards.

10. A video generator system, comprising:
    a physics simulator to adjust movement of a target object using a stability threshold and a movement agent, and to generate a frame of the target object; and
    a neural network (NN) to provide movement adjustments to the movement agent of the target object by indicating one or more of the movement adjustments utilizing one or more target angles of joints of a reference object from a motion capture (MOCAP) video clip
    wherein the NN is at least one of a tracking NN or a recovery NN and when the stability threshold is not satisfied, the movement agent is a recovery agent and the NN is the recovery NN.

11. The video generator system as recited in claim 10, wherein when the stability threshold is satisfied, the movement agent is a tracking agent and the NN is the tracking NN.

12. The video generator system as recited in claim 10, wherein the video generator system includes a first NN assigned as a tracking NN and a second NN assigned as a recovery NN.

13. The video generator system as recited in claim 10, wherein the movement adjustments includes employing one or more of torque parameters, angle and joint positioning parameters, applied force parameters, or gain parameters of one or more proportional derivative (PD) controllers.

14. The video generator system as recited in claim 10, wherein the NN and the physics simulator execute in parallel on one or more of a graphics processing unit (GPU) or central processing unit (CPU).

15. A computer program product having a series of operating instructions stored on a non-transitory computer-readable medium that directs a data processing apparatus when executed thereby to perform operations to imitate a reference object from a motion capture (MOCAP) video clip using a physics simulator and a neural network (NN), comprising:
    tracking the reference object using a movement agent of a target object; and
    adjusting a movement of the target object using a stability threshold and the movement agent, wherein the movement agent utilizes an output from the NN to provide modifications to the movement: and
    compensating for signal noise within the MOCAP utilizing the movement agent and the NN,
    wherein the output is indicative of at least one of: one or more of torque parameters, one or more angle and joint positioning parameters, one or more applied force parameters, or one or more gain parameters of one or more proportional derivative (PD) controllers.

* * * * *